Oct. 8, 1940.  C. H. PRESTON  2,217,495

AUTOMATIC SAFETY DOOR LOCK FOR MOTOR VEHICLES

Filed Nov. 3, 1938 — 2 Sheets-Sheet 1

INVENTOR
Charles H. Preston
BY
ATTORNEY

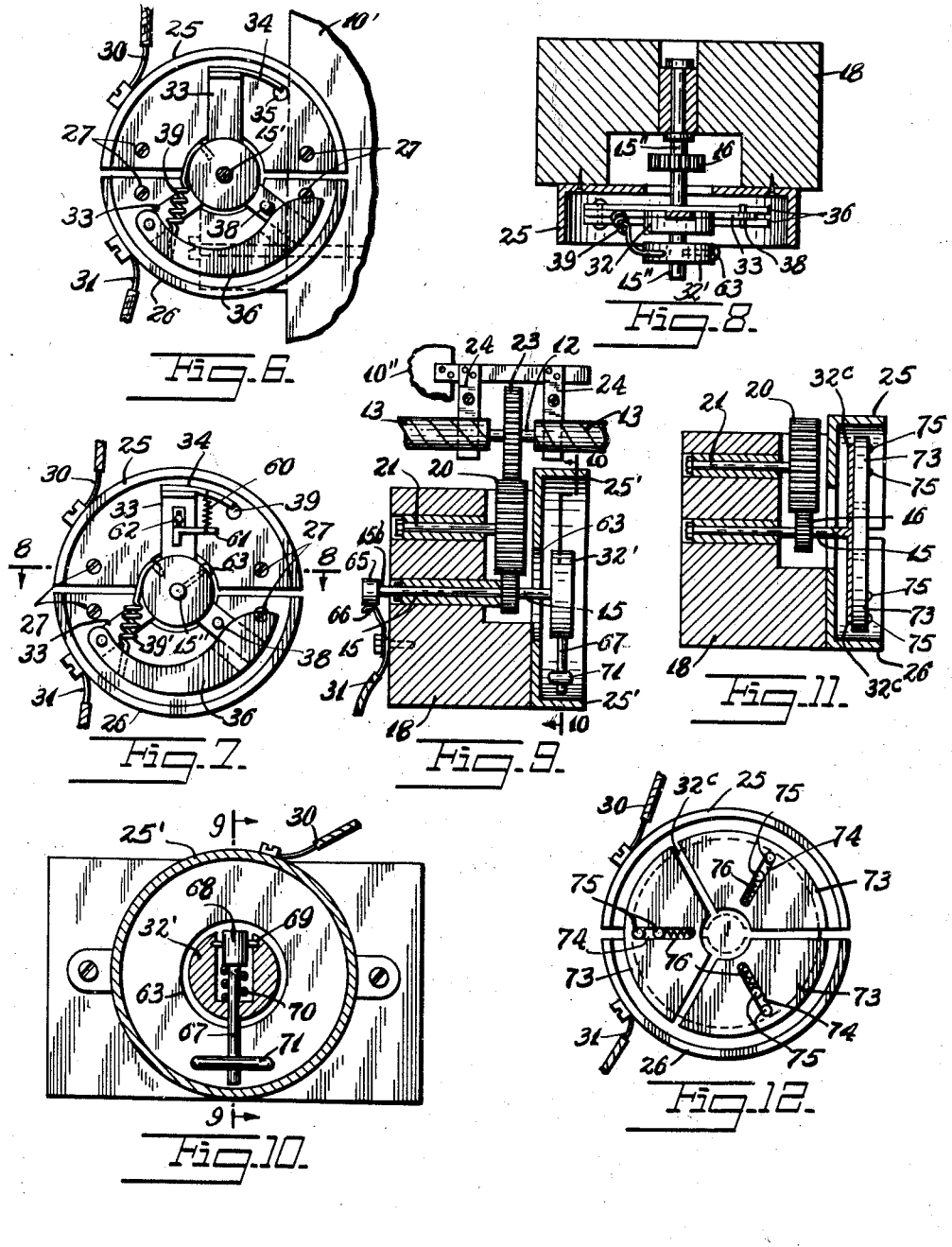

Patented Oct. 8, 1940

2,217,495

UNITED STATES PATENT OFFICE 2,217,495

AUTOMATIC SAFETY DOOR LOCK FOR MOTOR VEHICLES

Charles H. Preston, New York, N. Y.

Application November 3, 1938, Serial No. 238,577

1 Claim. (Cl. 200—80)

This invention relates to new and useful improvements in an automatic safety door lock for motor vehicles.

The invention has for an object the construction of a lock as mentioned which is controlled by a mechanism associated with the speedometer drive.

The invention contemplates the provision of a mechanism characterized by a rotative spindle connected with the speedometer drive shaft, either directly or indirectly, for controlling a circuit in a specific manner for controlling the door locks of a vehicle.

More specifically, the invention contemplates connecting the rotative spindle with the flexible drive shaft of the speedometer at a point where the flexible casing of the speedometer is split so that the connection with the rotative spindle may be accomplished with greater ease.

Still further the invention proposes an emergency arrangement for releasing the door locks in the event of emergency.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 6 is an end elevational view of Fig. 5.

Fig. 7 is another view similar to Fig. 3 but illustrating a further modification of the invention.

Fig. 8 is a horizontal sectional view taken on the line 8—8 of Fig. 7.

Fig. 9 is a fragmentary vertical sectional view of a modified form of the device, this view being taken on the line 9—9 of Fig. 10.

Fig. 10 is a vertical sectional view taken on the line 10—10 of Fig. 9.

Fig. 11 is a fragmentary vertical sectional view similar to Fig. 9 but illustrating a further modified form.

Fig. 12 is an end elevational view of Fig. 11.

Figure 1:
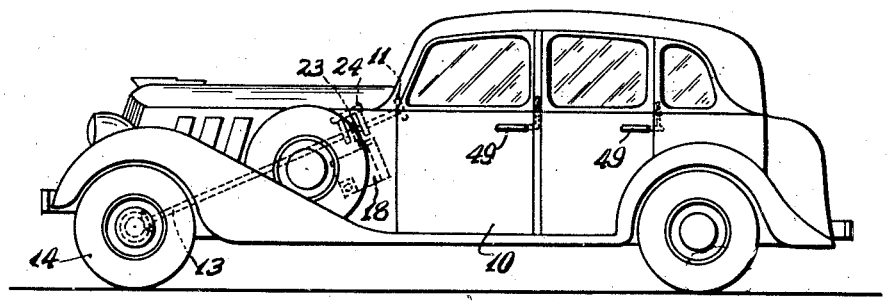
Fig. 1 is a side elevational view of a motor vehicle provided with a conventional speedometer and with an automatic safety vehicle door lock according to this invention.
Figure 2:
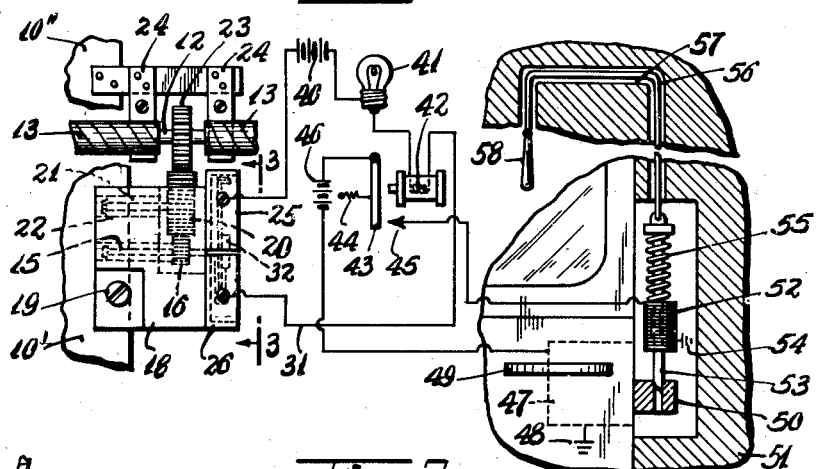
Fig. 2 is a fragmentary sectional view of a portion of Fig. 1 particularly disclosing the device, and to which schematic wiring has been added to fully disclose the construction.
Figures 3, 4:
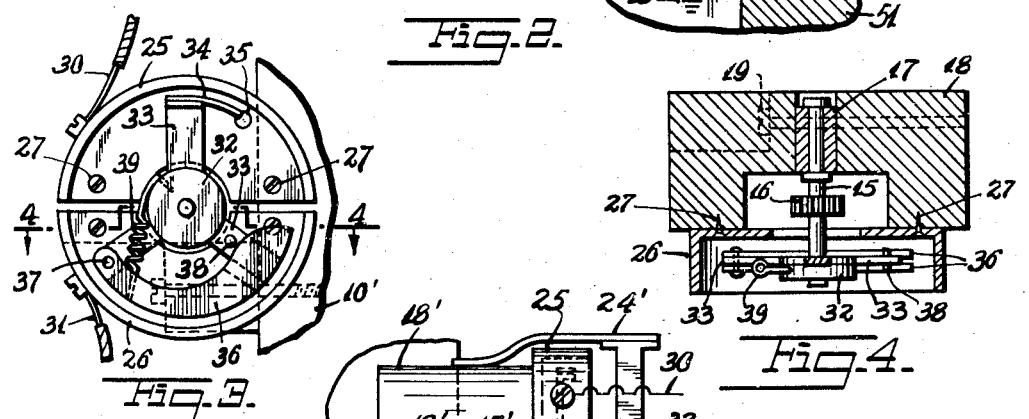
Fig. 3 is a fragmentary elevational view looking in the direction of the line 3—3 of Fig. 2.
Fig. 4 is a horizontal sectional view on the line 4—4 of Fig. 3.

The automatic safety door lock device for vehicles is intended to be used in combination with a motor vehicle 10 having a conventional speedometer 11 which is connected by the conventional flexible drive shaft 12 housed within a flexible cable 13, with one of the wheels, as illustrated, the front wheel 14 of the motor vehicle. The device includes a spindle 15 provided with a pinion 16 and rotatively supported in a bearing 17 which is mounted in a support block 18.

A fastening element 19 is adapted to stationarily secure the support block 18 upon a portion 10' of the motor vehicle. The pinion 16 meshes with a gear 20 fixed upon a shaft 21 rotatively supported in a bearing 22 mounted within the support block 18. The gear 20 meshes with a gear 23 fixed upon the speedometer drive shaft 12. The flexible tubular cover 13 of the drive shaft 12 is supported by brackets 24 mounted upon a portion 10'' of the motor vehicle.

A pair of opposed semi-cylindrical contacts 25 and 26 are stationarily mounted in slightly spaced positions coaxially about the spindle 15 upon the support block 18. Fastening elements 27 serve to secure the shells upon the block. The shells 25 and 26 are connected with a circuit as hereinafter more fully described. This circuit includes leads 30 and 31.

A hub 32 is mounted upon the spindle 15 and is disposed within the shells 25 and 26. Several radial arms 33 radially project from the hub 32 and terminate a short distance from the skirt walls of the shells 25 and 26. A leaf spring 34 is fixedly mounted at one of its ends upon one of the radial arms and at its free end supports a small weight 35. The arrangement is such that when the hub 32 rotates centrifugal force will flex the leaf spring 34 and cause it to contact the inner face of the skirt wall of the shells.

An arcuate member 36 is mounted on another one of the radial arms 33 at one of its ends by a pintle 37. At its other end the arcuate member 36 is formed with a fork portion, the fingers of which engage opposite faces of another one of the radial arms 33. This latter radial arm is provided with a pin 38 which limits inward pivoting of the arcuate member.

A tension spring 39 is connected between the arcuate member 36 and the hub 32 and normally holds the arcuate member against the pin 38. The arrangement is such that during rotation of the hub, centrifugal force will cause the free end of the arcuate member 36 to move outwards against the action of the spring 39 so that it contacts the shells 25 and 26.

The leads 30 and 31 are connected in a circuit which includes in series a source of power 40, a signal lamp 41 and the coil 42 of a relay. This relay is provided with a relay switch 43 urged into an open position by a spring 44. Energization of the relay causes the switch 43 to move against a contact 45 and close an auxiliary circuit. This auxiliary circuit includes in series a source of power 46 and the casing 47 of a door lock for the vehicle. This casing 47 is grounded at 48. The door lock is of conventional design and has a handle 49 by which it may be opened and closed. The bolt 50 of the door lock engages within a keeper in the frame 51 of the door. A latch device is provided for latching the bolt 50 in its closed position. This latch includes a solenoid 52 having a core 53. The coil of the solenoid 52 has one of its ends grounded at the point 54. Its other end connects with the contact 45.

A spring 55 is engaged upon the core 53 of the solenoid to normally urge the core upwards into an open position. An emergency cable 56 connects with the solenoid core 53 and extends through a passage 57 to the operator of the motor vehicle to passengers within the vehicle. A handle 58 is connected with the outer end of the cable 56 by which it may be conveniently drawn to release the latch 53.

The operation of the device is as follows:

When the vehicle is standing still the speedometer shaft 12 is not rotating. Consequently, the contact spring 34 and the arcuate member 36 are out of contact with the shells 25 and 26. The primary circuit is therefore open and no current flows. The lamp 41 is not lit. The spring 55 holds the solenoid core 53 in a raised position out of the bolt 50 of the lock. The door lock may therefore be opened. Thus when the vehicle is stationary all of the doors are free to be opened.

As soon as the vehicle moves the speedometer shaft turns. This rotation is transmitted to the spindle 15 which then rotates the hub 32. Instantly the leaf spring 34 makes contact due to centrifugal force, with the shells 25 or 26 depending merely in which position the hub happens to be at the particular instant. Similarly, the arcuate member 36 is also making contact with one of the other of the shells or simultaneously with both of the shells. The primary circuit is therefore closed since current may now flow from the lead 30 to the lead 31. The lamp 41 is then illuminated. The relay operates to close the secondary circuit.

The secondary circuit energizes the solenoid 52 and its core 53 moves downwards engaging the bolt 50. Now the door lock is latched closed and cannot be opened. It should be understood that the automatic safety door lock may be applied to all of the doors of the motor vehicle, or it may be applied to each of the doors excepting the key lock door. In the event of emergency, should it be required to open the doors, though the vehicle is moving, it is merely necessary that the emergency handle 58 be pulled. This will cause the solenoid core 53 to be moved free from the bolt 50. The door is now free to open.

Figure 5:
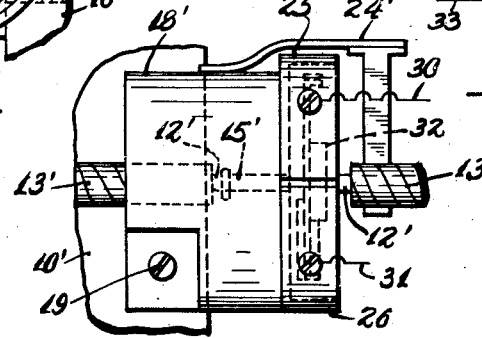
Fig. 5 is a fragmentary side elevational view similar to a portion of Fig. 2 but illustrating a modified construction.

In Figs. 5 and 6 a modified form of the invention has been disclosed which distinguishes from the prior form merely in the fact that the spindle 15' which supports the hub 32 is directly connected with the speedometer shaft 12'. The speedometer shaft extends through the flexible casing 13'. At the coupling, one end of the flexible casing 13' is supported by a bracket 24'. The other end is supported upon the support block 18'. Turning of the speedometer drive shaft 12' will directly rotate the hub 32. In other respects this form of the invention is similar to the previous form.

In Figs. 7 and 8 a still further modified form of the invention has been disclosed which distinguishes from the prior forms in the fact that an arrangement has been provided whereby it is possible to control the instant of operation of the safety device. For example, it is possible to cause the safety device to operate only when the vehicle is moving at a speed greater than three miles an hour, or at some other small speed.

The adjustment is characterized by providing a spring 60 connected at one end of the leaf spring 34 and at its other end to a bracket 61 which is adjustably mounted on one of the radial arms 33. A clamp screw 62 engaging through a slot in the bracket threadedly engages the radial arm 33 and serves to adjustably hold the bracket as required. The spring 39' is connected at its outer end with the arcuate member 36. At its inner end it is connected with an auxiliary hub 32'. This auxiliary hub is adjustably mounted on the spindle 15''. There is a set screw 63 engaging through the auxiliary hub 32', and abutting the spindle 15'' for holding the auxiliary hub in selected positions. It is possible to shift the auxiliary hub to vary the tension of the spring 39.

It will be noted that it is possible to control the tension of the springs 39 and 60 for delaying or advancing the contacting of the leaf spring 34 and the arcuate member 36 with the shells 25 and 26 according to predetermined speeds of rotation of the spindle.

In Figs. 9 and 10 a still further modified form of the invention has been disclosed which distinguishes from the prior form in the manner in which the circuit is controlled through the device. According to this form of the invention there is a single cylindrical shell 25' which is formed with a relatively large central opening 63 avoiding the spindle 15. The spindle 15 is rotatively supported and connected with the flexible drive shaft of the speedometer as explained in Figs. 1 to 4. The spindle 15 is provided with a projecting rear portion 15ᵇ upon which there is a contact wheel 65. This contact wheel is engaged by a brush 66 connected with the cable 31.

The cable 30 is connected with the shell 25'. A hub 32' is mounted upon the spindle 15 within the shell 25' and is formed with an opening through its center. Within this opening there is a shaft 67. This shaft is provided with a cylindrical portion 68 slidably supported by several rollers 69. A spring 70 acts to urge the shaft inwards. The shaft is provided with a weight 71 at its extended end. The arrangement is such that when the hub 32 rotates centrifugal force will urge the shaft 67 outwards so that its outer end contacts the shell 25'. A circuit will then be closed from the lead 30 to the shell 25', to the radial arm 67, the hub 32', the spindle 15, the extension 15ᵇ, the wheel 65, the brush 66 and the lead 31.

In Figs. 11 and 12 another modified form of the invention has been disclosed which distinguishes from the prior forms specifically in the construction of the centrifugal elements. According to this form of the invention the spindle 15 is provided with a disc shaped hub 32c. Several segmental weights 73 are radially slidably mounted on the disc 32c. Each of the segments 73 is provided with a radial slot 74. Several pins 75 project from the disc 32c and engage the radial slots. Thus the segments are radially slidably supported. A spring 76 is mounted in each one of the slots 74 and acts between one of the ends of the slot and one of the pins for resiliently urging the segment inwards. Upon rotation of the spindle 15 centrifugal force will cause the segments 73 to move outwards and contact the shells 25 and 26. In other respects this form of the invention is similar to the previous forms.

The circuit will then be closed from one of the shells to the other.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

In a device of the class described, a rotative spindle, contacts stationarily mounted coaxially of said spindle, a hub formed on said spindle, a radial arm extending from said hub, an arcuate member pivotally mounted on said arm and adapted to move outwards and engage said contacts due to centrifugal force when said spindle turns, resilient means for holding said arcuate member inwards until a predetermined speed of turn is reached, and means for varying the tension of said resilient means to change the predetermined speed at which said arcuate member will move outwards to engage said contacts, said resilient means comprising a coil spring, said latter-mentioned means comprising an auxiliary hub rotatively mounted on said spindle, said spring having one end mounted on said arcuate member and its other end attached to said hub, and means for holding said hub in various rotative positions on said spindle to increase or decrease the tension of said spring comprising a set screw threadedly engaged through said auxiliary hub and against said spindle.

CHARLES H. PRESTON.